US012673589B2

(12) United States Patent
Zhang et al.

(10) Patent No.: US 12,673,589 B2
(45) Date of Patent: Jul. 7, 2026

(54) ZERO-GRAVITY SEAT AND VEHICLE COMPRISING SAME

(71) Applicant: YANFENG AUTOMOTIVE TRIM SYSTEMS CO., LTD, Shanghai (CN)

(72) Inventors: Wu Zhang, Shanghai (CN); Xun Tang, Shanghai (CN); Dahai Qian, Shanghai (CN)

(73) Assignee: YANFENG AUTOMOTIVE TRIM SYSTEMS CO., LTD, Shanghai (CN)

( * ) Notice: Subject to any disclaimer, the term of this patent is extended or adjusted under 35 U.S.C. 154(b) by 515 days.

(21) Appl. No.: 17/637,330

(22) PCT Filed: Mar. 5, 2020

(86) PCT No.: PCT/CN2020/077922
§ 371 (c)(1),
(2) Date: Jun. 28, 2022

(87) PCT Pub. No.: WO2021/036221
PCT Pub. Date: Mar. 4, 2021

(65) Prior Publication Data
US 2022/0363166 A1 Nov. 17, 2022

(30) Foreign Application Priority Data

Aug. 23, 2019 (CN) .......................... 201910782504.6

(51) Int. Cl.
*B60N 2/22* (2006.01)
*B60N 2/68* (2006.01)

(52) U.S. Cl.
CPC ............... *B60N 2/22* (2013.01); *B60N 2/682* (2013.01)

(58) Field of Classification Search
CPC .................................. B60N 2/22; B60N 2/682
See application file for complete search history.

(56) References Cited

U.S. PATENT DOCUMENTS 5,527,087 A * 6/1996 Takeda ................. B60N 2/3065
297/378.12
7,137,666 B2 * 11/2006 Haladuda ............. B60N 2/3065
297/367 R
(Continued)

FOREIGN PATENT DOCUMENTS

CN 109050355 A 12/2018
CN 208896905 U 5/2019
(Continued)

OTHER PUBLICATIONS

Saki, O., First Office Action issued in Japan Patent Application No. 2022-513217 dated May 23, 2023, with English language translation, 10 pages.
(Continued)

*Primary Examiner* — Philip F Gabler
(74) *Attorney, Agent, or Firm* — MH2 Technology Law Group LLP

(57) ABSTRACT

A zero-gravity seat comprises a seat base, a seat back, a front support frame, and a rear support frame. Upper ends of the front support frame and the rear support frame are respectively hinge-connected to front and rear ends of the seat base. Lower ends of the front support frame and the rear support frame are respectively hinge-connected to a seat mounting base. A lower end of the seat back can rotate around a rear end portion of the seat base. When the seat back and the seat base rotate in a linked manner, a small step difference or even no step difference is present between a lower end portion of the seat back and the upper end surface of the seat base such that the back of the occupant conforms to the seat back, thereby ensuring the comfort of a ride.

10 Claims, 6 Drawing Sheets

(56)  References Cited

U.S. PATENT DOCUMENTS

| | | | | |
|---|---|---|---|---|
| 7,850,220 | B2 * | 12/2010 | Holdampf | B60N 2/3075 296/65.09 |
| 10,377,270 | B2 * | 8/2019 | Park | B60N 2/34 |
| 10,507,744 | B2 * | 12/2019 | Kim | B60N 2/34 |
| 10,829,014 | B2 * | 11/2020 | Sivaraj | B60N 2/36 |
| 10,974,621 | B2 * | 4/2021 | Jung | B60N 2/045 |
| 2014/0361592 | A1 | 12/2014 | Kuno | |
| 2016/0297337 | A1 | 10/2016 | White et al. | |
| 2018/0022248 | A1 | 1/2018 | Ketels et al. | |
| 2018/0065530 | A1 | 3/2018 | Hoshi | |
| 2018/0079333 | A1 | 3/2018 | Ma | |
| 2018/0272896 | A1 | 9/2018 | Park et al. | |

FOREIGN PATENT DOCUMENTS

| | | |
|---|---|---|
| CN | 209022797 U | 6/2019 |
| CN | 110435506 A | 11/2019 |
| EP | 0884213 A2 | 12/1998 |
| JP | 60-152940 U | 4/1986 |
| JP | H0168948 U | 5/1989 |
| JP | 1990022137 U | 2/1990 |
| JP | H0222137 U | 2/1990 |
| JP | 07-144564 A | 6/1995 |
| JP | 2015-016851 A | 1/2015 |
| JP | 2016-538182 A | 12/2016 |
| JP | 2018187977 A | 11/2018 |

OTHER PUBLICATIONS

Aug. 2, 2023 Supplementary European Search Report issued in European.
International Search Report (With English Translation) issued in International Patent Application No. PCT/CN2020/077922 mailed on May 12, 2020, 7 pages.
Written Opinion (With English Translation) of the International Searching Authority issued in International Patent Application No. PCT/CN2020/077922 mailed on May 12, 2020, 10 pages.
First Office Action (with English Translation) issued in Chinese Patent Application No. 201910782504.6 dated Mar. 20, 2020, 12 pages.
Second Office Action (With English Translation) issued in Chinese Patent Application No. 201910782504.6 dated Oct. 13, 2020, 14 pages.
Notice of Reasons for Refusal issued in Japan Patent Application No. 2022-513217 dated Dec. 19, 2023 , with English language translation, 9 pages.

* cited by examiner

Prior Art

Prior Art

ZERO-GRAVITY SEAT AND VEHICLE COMPRISING SAME

CROSS REFERENCE TO RELATED APPLICATIONS

The present application is the national stage entry of International Patent Application No. PCT/CN2020/077922, filed on Mar. 5, 2020, and published as WO 2021/036221 A1 on Mar. 4, 2021, which claims the benefit of Chinese Patent Application No. 201910782504.6, filed on Aug. 23, 2019, all of which are incorporated by reference herein in their entirety.

TECHNICAL FIELD

The present disclosure relates to the technical field of vehicles, in particular to a Zero-gravity seat and vehicle comprising same.

BACKGROUND

Zero gravity technology has been applied in the furniture and car seat industries. The schematic diagram of the existing zero-gravity seat is shown in FIGS. 1-2. A seat base 1, a front support frame 3, a rear support frame 4 and a seat mounting base form a set of four-bar linkage. When the seat back 2 is adjusted by the angle adjuster, meanwhile the seat back 2 rotates backward, the angle adjuster drives the rear support frame 4 to rotate through the connecting plate 202 so that the seat base 1 also rotates synchronously. Since the rotation center C of the seat back 2 is set above the seat base 1, a step difference S is formed between the lower end of the seat back 2 and the upper end surface of the seat base 1 during the backward rotation of the seat back 2, and the larger the backward adjustment angle of the seat back 2, the greater the step difference S. This makes the back of the passenger pressed by the bump A at the lower end of the seat back in the process of backward rotation of the passenger's torso, which makes the back unable to fit the seat back 2 and affects the riding comfort.

CONTENT OF THE PRESENT INVENTION

The technical problem to be solved by the present invention is to overcome the defect that when the zero-gravity seat of prior art performs the synchronous adjustment of the seat base and the seat back, the lower end of the seat back will push against the back of the passenger, which affects the comfort of the ride, a zero-gravity seat and a car including the same are provided.

The present disclosure solves the above-mentioned technical problems through the following technical solutions:

A zero-gravity seat includes a seat base, a seat back, a front support frame, a rear support frame, upper ends of the front support frame and the rear support frame are respectively hinge-connected to front and rear ends of the seat base, lower ends of the front support frame and the rear support frame are respectively hinge-connected to a seat mounting base, wherein the lower end of the seat back is rotatable around a rear end portion of the seat base, a rotation center of the seat back is located below an upper end surface of the seat base;

The rotation center coincides with a hinge-connecting center of the upper end of the rear support frame, and the upper end of the rear support frame is fixed on the seat back.

In the present scheme, by moving the rotation center of the seat back down to coincide with the hinge-connecting center of the rear support frame of the seat base, and the rotation center of the seat back is located below the upper end surface of the seat base, so that when the seat back and the seat base are linked together to rotate, a small step difference or even no step difference is present between a lower end portion of the seat back and the upper end surface of the seat base. Therefore, the lower end portion of the seat back does not stick into the back of a passenger, such that the back of the passenger conforms to the seat back, thereby ensuring the comfort of a ride.

Preferably, a hinge-connecting center of the lower end of the rear support frame is located on the front side of the rotation center, a hinge-connecting center of the lower end of the front support frame is located at the rear side of the hinge-connecting center of the upper end of the front support frame.

In the present scheme, through the configuration of the above structure, when the seat back is turned back, the upper end of the rear support frame is deflected backward from top to bottom, and the front support frame is deflected backward from bottom to top. In this way, the distance between the front support frame and the upper end of the rear support frame can be increased, and the rearward inclination angle of the seat base can be larger, so that the thighs of the passenger can better fit the seat base during the process of reclining, thereby further ensuring the comfort of a ride.

Preferably, an angle adjuster is arranged at the rotation center of the seat back, a fixing part of the angle adjuster is fixed on the seat base and a rotating part of the angle adjuster is fixed on the rotation center.

In the present scheme, the angle between the seat base and the seat back is adjusted by the angle adjuster, and the locking mechanism of the angle adjuster can keep the angle between the seat base and the seat back unchanged after the adjustment is completed.

Preferably, the seat base includes two oppositely arranged side wall plates, and the seat back includes two oppositely arranged back wall plates, one said angle adjuster is arranged between each of the side wall plates and the back wall plates, and side connecting surfaces of the fixed part and the rotating part of the angle adjuster are respectively fixed to the side wall plate and the back wall plate by welding.

In the present scheme, the seat base and the seat back are both assembled by using skeleton structure, and the assembly of the seat is achieved through the simple side wall plate and the back wall plate, which not only reduces the weight of the seat, but also reduces the production cost. The angle adjuster is arranged between the side wall plate of the seat base and the back wall plate of the seat back, and is fixed by welding.

Preferably, both the front support frame and the rear support frame are provided with two, the two front support frames are respectively arranged on the front ends of two said side wall plates, and two said rear support frames are respectively arranged on a rear end of the side wall plate.

In the present scheme, by adopting a front support frame at the front end of the side wall plate of the seat base, and a rear support frame at the rear end of the side wall plate respectively, so that the side wall plate, the seat mounting base, the front support frame and the rear support frame together form two sets of four-bar linkage mechanisms, and two of the sets of four-bar linkage mechanisms are arranged on both sides of the seat, which can ensure the stability of the seat during adjustment.

Preferably, a first connecting rod is provided between two said side wall plates, and two ends of the first connecting rod are respectively fixedly connected with the rotating parts of two said angle adjusters.

In the present scheme, the rotating parts of the two angle adjusters are connected by the first connecting rod, so that when one of the angle adjuster is driven to work, the other angle adjuster can be driven to work, there is no need to drive the two angle adjusters separately at the same time.

Preferably, a second connecting rod is provided between the two side wall plates, and two ends of the second connecting rod are respectively fixedly connected with the front ends of the two side wall plates.

In the present scheme, the second connecting rod connects the front ends of the two side wall plates, which can increase the stability of the seat base during rotation adjustment.

Preferably, a front hinge seat and a rear hinge seat are respectively provided on the seat mounting base, and the front support frame is hinged on the front hinge seat, and the rear support frame is hinged on the rear hinge seat.

In the present scheme, in order to facilitate the hinge of the lower ends of the front support frame and the rear support frame, the seat mounting base is provided with a hinge seat, which also facilitates the assembly of the seat and the adjustment of the installation position in later stage.

Preferably, the rear support frame and the seat back are integrally formed or assembled together.

In the present scheme, the rear support frame and the seat back can be processed in an integrated way, or they can be processed separately before assembly and installation. Since the rear support frame needs to bear a large working intensity and requires high-performance materials, relatively speaking, the seat back only needs to bear part of the pressure of the human body, and the material requirements of the seat back are much lower than that of the rear support frame. Therefore, in order to avoid waste, the rear support frame is generally processed separately using high-performance materials, and then assembled with the seat back.

Preferably, a driving mechanism is provided on the angle adjuster, the driving mechanism is controlled by a manual drive or an electric drive, and the driving mechanism drives the rotating part of the angle adjuster to rotate, so as to achieve the rotation of the seat back around the rotation center.

A vehicle, wherein the vehicle comprises the zero-gravity seat as described above.

Based to common knowledge in the art, the above preferred conditions may be arbitrarily combined to obtain the better embodiments of the present disclosure.

The positive progressive effect of the present disclosure is that: The zero-gravity seat of the present invention coincides with the hinge-connecting center of the rear support frame of the seat base by moving the rotation center of the seat back down, and the rotation center of the seat back is located below an upper end surface of the seat base, so that the seat back and the seat base can be linked together to rotate, so that the angle between the torso and the thigh can be adjusted in place at one time. And a small step difference or even no step difference is present between the lower end portion of the seat back and the upper end surface of the seat base. Therefore, the lower end portion of the seat back does not stick into the back of a passenger, such that the back of the passenger conforms to the seat back, thereby ensuring the comfort of a ride.

REFERENCE NUMBERS

Figure 1:
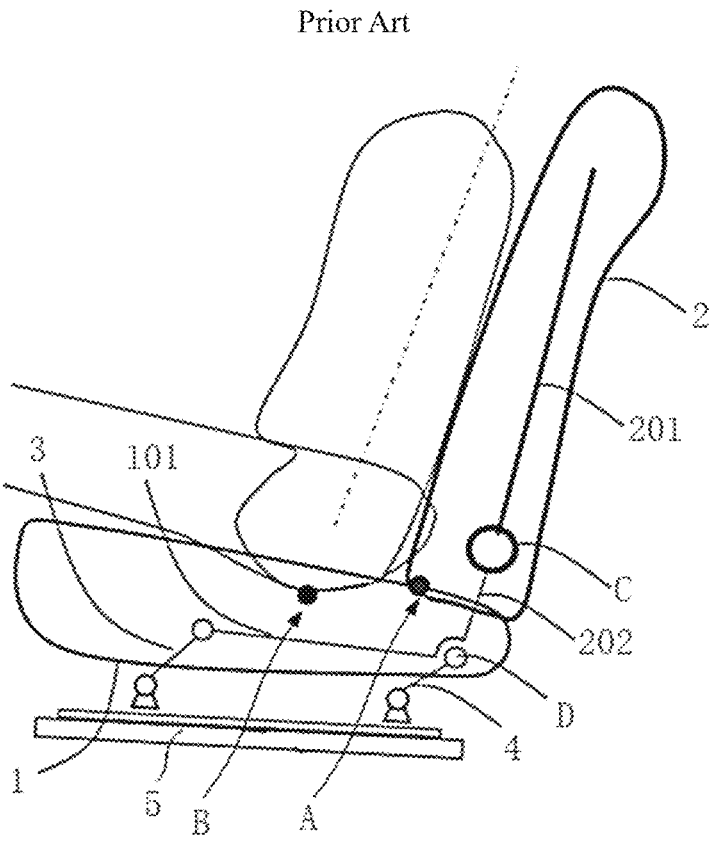
FIG. 1 is a schematic diagram of a seat in the prior art.
Figure 2:
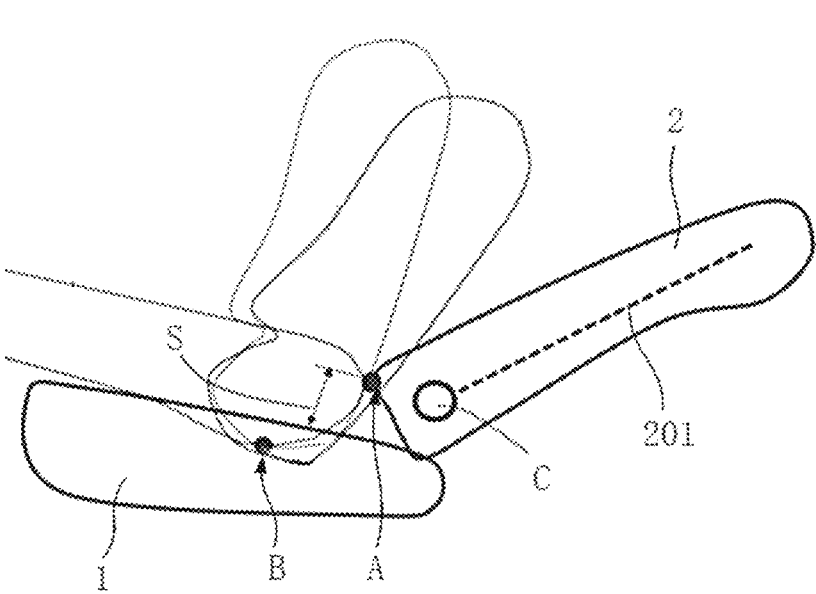
FIG. 2 is a schematic diagram of a seat after adjustment in the prior art.

Bump A on the lower end of the seat back
Contact point B between the lower end of the passenger's hip and the seat
Rotation center C of the seat back in the prior art
Rotation center D of the seat base in the prior art
Linkage rotation center E of the seat base and the seat back in the present invention
Seat base 1
a rear end portion of the seat base 12
upper send surface of the seat base 120
Side wall plate 101
Front end of side wall plate 1011
Rear end of side wall plate 1012
Seat back 2
lower end of the seat base 21
rotation center of the seat back 22
Back wall plate 201
Connecting plate 202
Front support frame 3
hinge-connecting center of the upper end of the front support frame 31
hinge-connecting center of the lower end of the front support frame 32
Rear support frame 4
hinge-connecting center of the upper end of the rear support frame 41
hinge-connecting center of the lower end of the rear support frame 42
the top end of the rear support frame 43
Seat mounting base 5
First connecting rod 6
Second connecting rod 7
Angle adjuster 8
fixing part of the angle adjuster 81
rotating part of the angle adjuster 82
Side connecting surfaces of the fixed part of the angle adjuster 810
Side connecting surfaces of the rotating part of the angle adjuster 820
Driving mechanism 9
Front hinge seat 10
Rear hinge seat 11

DETAILED DESCRIPTION OF THE PREFERRED EMBODIMENT

The present invention will be further described in the way of embodiments, but it is not limited to the scope of embodiments, but the present invention is not hence limited within the range of the embodiments.

Figure 3:
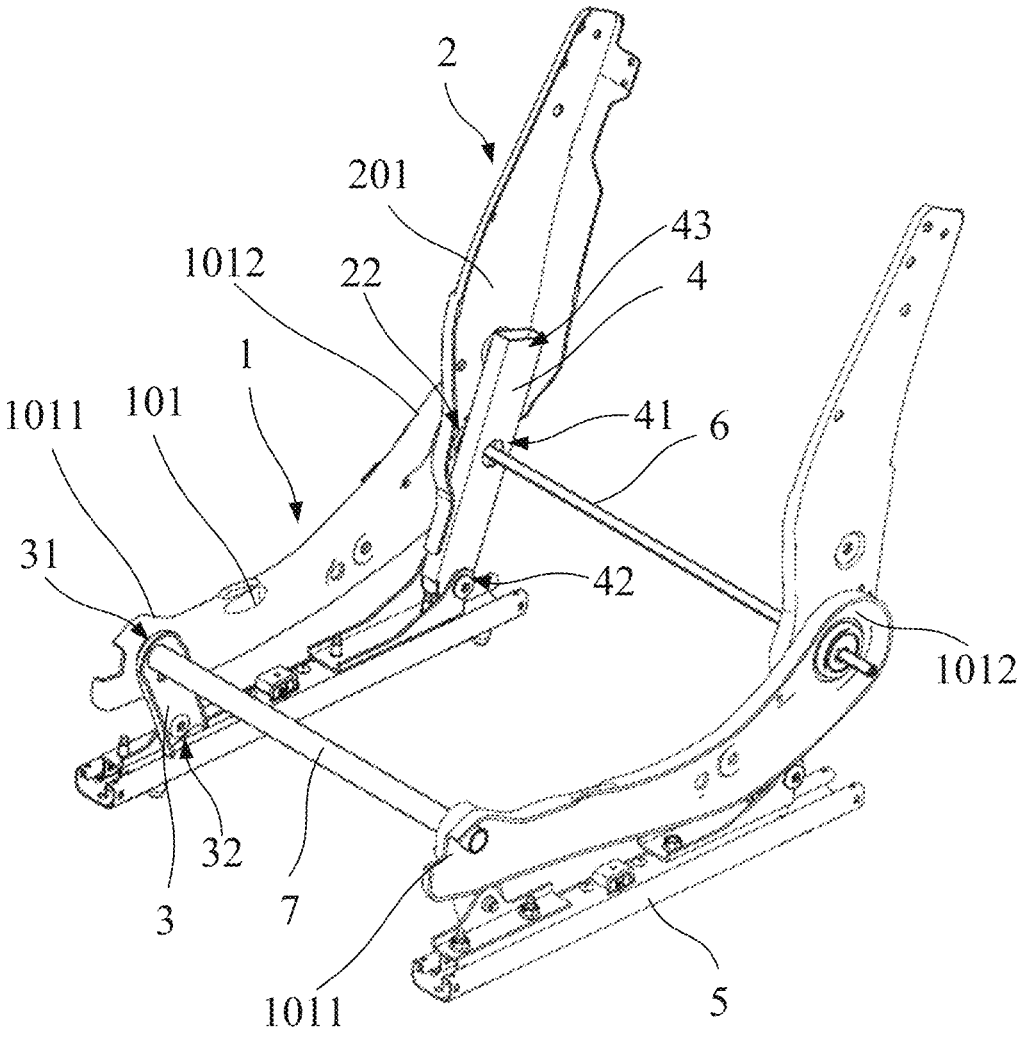
FIG. 3 is a schematic diagram of the frame structure of the seat in the preferred embodiment of the present invention.
Figure 4:
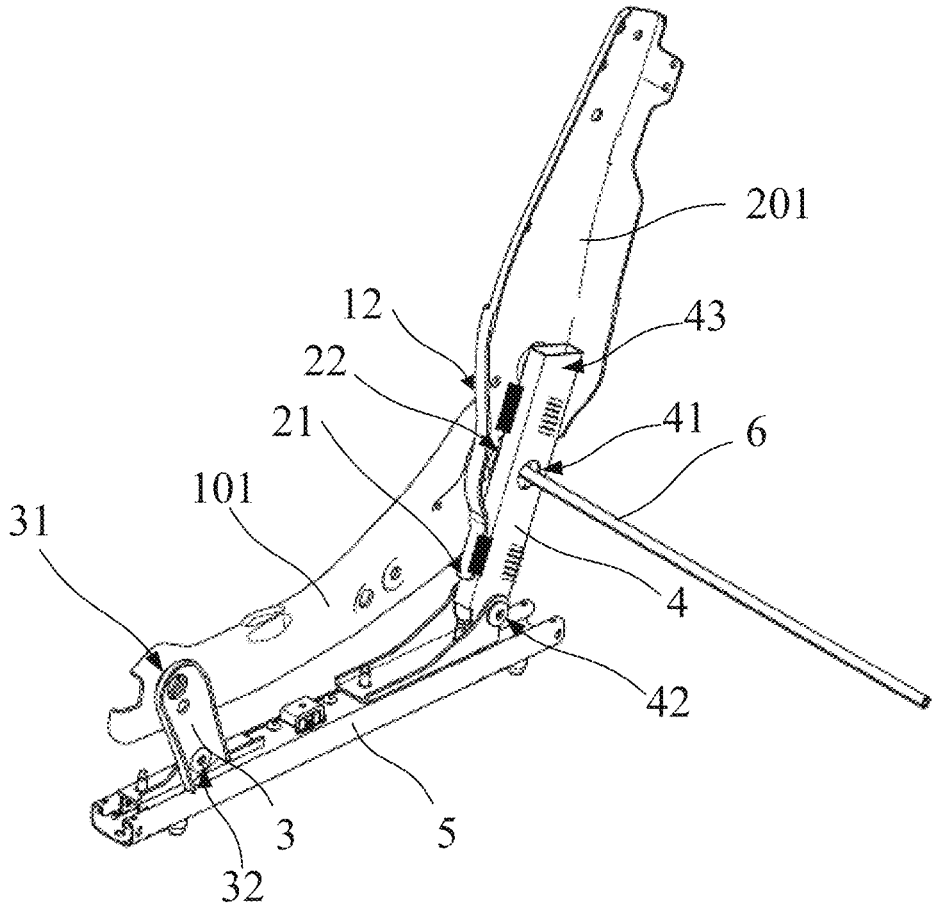
FIG. 4 is a schematic diagram of a partial structure of the frame of the seat in the preferred embodiment of the present invention.
Figures 5, 6:
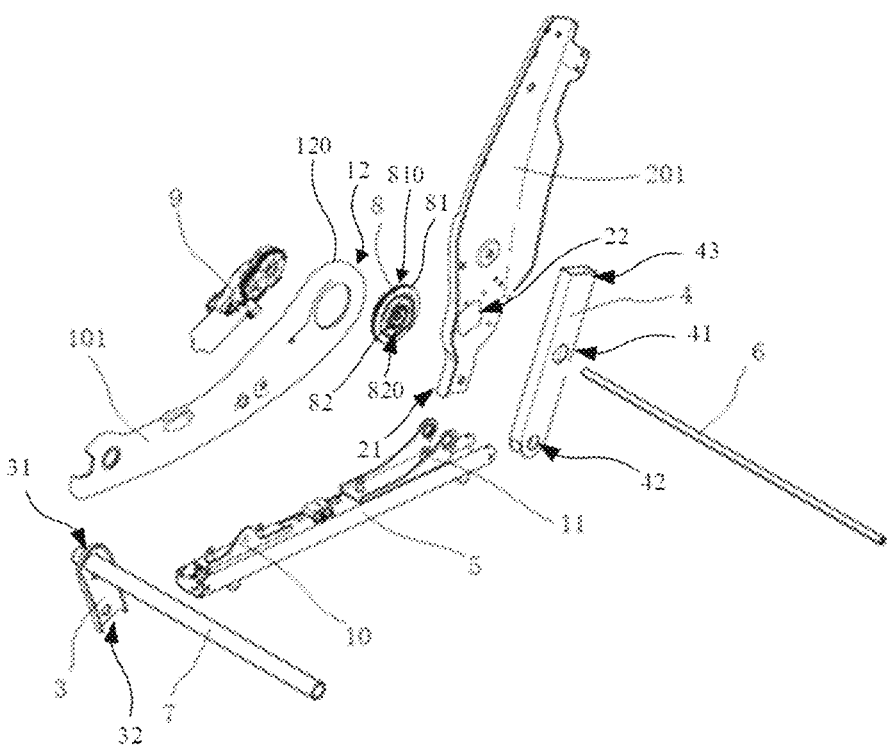
FIG. 5 is an exploded schematic diagram of the partial structure of the seat frame in the preferred embodiment of the invention.
FIG. 6 is a schematic diagram of the seat in the preferred embodiment of the present invention.
Figure 7:
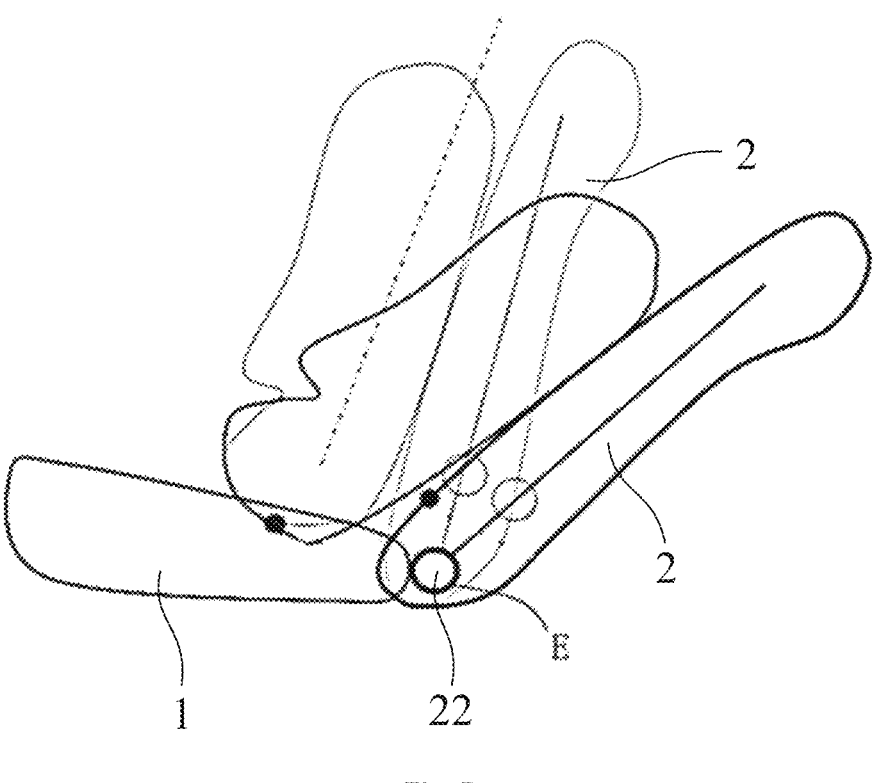
FIG. 7 is a schematic diagram of the seat in the preferred embodiment of the present invention when the seat is used for linkage adjustment.

As shown in FIG. 3-FIG. 7, the zero-gravity seat of the present invention includes a seat base 1, a seat back 2, a front support frame 3, a rear support frame 4, the upper ends of the front support frame 3 and the rear support frame 4 are respectively hinge-connected to front and rear ends of the seat base 1, the lower ends of the front support frame 3 and the rear support frame 4 are respectively hinge-connected to a seat mounting base 5, a lower end 21 of the seat back 2 can rotate around a rear end portion 12 of the seat base 1, a rotation center 22 of the seat back 2 is located below an upper end surface 120 of the seat base 1; the rotation center 22 coincides with a hinge-connecting center 41 of the upper end of the rear support frame 4, and the top end 43 of the rear support frame 4 is fixed on the seat back 2.

In this embodiment, by moving the rotation center 22 of the seat back 2 downward to coincide with the hinge-connecting center of the bracket at the end of the seat 1, and the rotation center 22 of the seat back 2 is located below the upper end surface 120 of the seat 1, so that when the seat back 2 and the seat base 1 are linked together to rotate, a small step difference or even no step difference is present between a lower end portion of the seat back 2 and the upper end surface 120 of the seat base 1. Therefore, the lower end portion of the seat back 2 does not stick into the back of a passenger, such that the back 2 of the passenger conforms to the seat back, thereby ensuring the comfort of a ride.

The hinge-connecting center of the lower end of the rear support frame 4 is located on the front side of the rotation center, the hinge-connecting center of the lower end of the front support frame 3 is located at the rear side of the hinge-connecting center of the upper end of the front support frame 3.

In this embodiment, through the configuration of the above structure, when the seat back 2 is turned back, the upper end of the rear support frame 4 is deflected backward from top to bottom, and the front support frame 3 is deflected backward from bottom to top, in this way, the distance between the front support frame 3 and the upper end of the rear support frame 4 can be increased, and the rearward inclination angle of the seat base 1 can be changed at a larger angle, so that the thighs of the passenger can better fit the seat base during the process of reclining, thereby further ensuring the comfort of a ride.

In this embodiment, an angle adjuster 8 is provided at the rotation center 22 of the seat back, the fixing part 81 of the angle adjuster 8 is fixed on the seat base 1 and the rotating part 82 of the angle adjuster 8 is fixed on the rotation center 22, the angle between the seat base 1 and the seat back 2 is adjusted by the angle adjuster 8, and the locking mechanism of the angle adjuster 8 can keep the angle between the seat base 1 and the seat back 2 unchanged after adjustment is completed.

The seat base 1 includes two oppositely arranged side wall plates 101, and the seat back 2 includes two oppositely arranged back wall plates 201, an angle adjuster 8 is arranged between each of the side wall plates 101 and the back wall plates 201, and the side connecting surfaces 810, 820 of the fixed part 81 and the rotating part of the angle adjuster 8 are respectively welded and fixed to the side wall plate 101 and the back wall plate 201. In this embodiment, the seat base 1 and the seat back 2 are assembled by using skeleton structure, and the assembly of the seat is achieved through a simple side wall plate 101 and a back wall plate 201, which not only reduces the weight of the seat, but also reduces the production cost. The angle adjuster 8 is provided between the side wall plate 101 of the seat base 1 and the back wall plate 201 of the seat back 2, and is fixed by welding.

In this embodiment, both the front support frame 3 and the rear support frame 4 are provided with two, the two front support frames 3 are respectively arranged on the front ends 1011 of the two side wall plates 101, and the two rear support frames 4 are respectively arranged on the rear end 1012 of the side wall plate 101. By adopting a front support frame 3 at the front end 1011 of the side wall plate 101 of the seat base 1, and a rear support frame 4 at the rear end 1012 of the side wall plate 101 respectively, in this way, the side wall plate 101, the seat mounting base 5, the front support frame 3 and the rear support frame 4 together form two sets of four-bar linkage mechanisms, and the two sets of four-bar linkage mechanisms are arranged on both sides of the seat, which can ensure the stability of the seat during adjustment.

In this embodiment, a first connecting rod 6 is provided between the two side wall plates 101, and two ends of the first connecting rod 6 are respectively fixedly connected with the rotating parts 82 of the two angle adjusters 8. The rotating parts 82 of the two angle adjusters 8 are connected by the first connecting rod 6, so that when one of the angle adjuster 8 is driven to work, the other angle adjuster 8 can be driven to work, there is no need to drive the two angle adjusters 8 separately at the same time. In order to increase the stability of seat base 1 during rotation adjustment, a second connecting rod 7 is provided between the two side wall plates 101, and two ends of the second connecting rod 7 are respectively fixedly connected with the front ends 1011 of the two side wall plates 101.

A front hinge seat 10 and a rear hinge seat 11 are respectively provided on the seat mounting base 5, and the front support frame 3 is hinged on the front hinge seat 10, and the rear support frame 4 is hinged on the rear hinge seat 11. This is to facilitate the hinge of the lower ends of the front support frame 3 and the rear support frame 4, the seat mounting base 5 is provided with a hinge seat, which also facilitates the assembly of the seat and the adjustment of the installation position in later stage.

The rear support frame 4 and the seat back 2 are integrally formed or assembled together. The rear support frame 4 and the seat back 2 can be processed in an integrated way, or they can be processed separately before assembly and installation. Since the rear support frame 4 needs to bear a large working intensity and requires high-performance materials, relatively speaking, the seat back 2 only needs to bear part of the pressure of the human body, and the material requirements of the seat back 2 are much lower than that of the rear support frame 4. Therefore, in this embodiment, in order to avoid waste, the rear support frame 4 is generally processed separately using high-performance materials, and then assembled with the seat back 2.

A driving mechanism 9 is provided on the angle adjuster 8, the driving mechanism 9 is controlled by a manual drive or an electric drive, and the driving mechanism drives the rotating part 82 of the angle adjuster 8 to rotate, so as to achieve the rotation of the seat back 2 around the rotation center 22. Customers can choose freely according to their own needs. In order to satisfy the automatic control of the seat, in this embodiment, the driving mechanism 9 adopts electric driving control. In addition, manual drive control or electric drive control can be used on the seat at the same time, as long as it is satisfied that when one driving mechanism is used for control, the other driving mechanism will not interfere with the movement of the angle adjuster.

The invention also discloses a vehicle, which includes the above zero-gravity seat.

Although the specific embodiments of the present invention are described above, those skilled in the art should understand that these are only an example, and the protection scope of the present invention is defined by the appended claims. Those skilled in the art can make various amendments or modifications to these embodiments without departing from the principle and essence of the present invention, but these amendments and modifications all fall within the protection scope of the present invention.

What is claimed is:

1. A zero-gravity seat includes a seat base, a seat back, a front support frame, a rear support frame, upper ends of the front support frame and the rear support frame are respectively hinge-connected to front and rear ends of the seat base, lower ends of the front support frame and the rear support frame are respectively hinge-connected to a seat mounting base, wherein a lower end of the seat back is rotatable around a rear end portion of the seat base, and a rotation center of the seat back is located below an upper end surface of the seat base;

the rotation center is coaxial with a hinge-connecting center of the upper end of the rear support frame, and a top end of the rear support frame is fixed on the seat back, wherein an angle adjuster is arranged at the rotation center of the seat back, a fixing part of the angle adjuster is directly fixed on the seat base and a rotating part of the angle adjuster is directly attached on the rotation center, wherein the seat base includes two oppositely arranged side wall plates, and the seat back includes two oppositely arranged back wall plates, one angle adjuster is arranged between each pair of corresponding side wall plates and the back wall plates, with side connecting surfaces of the fixed part and the rotating part of each angle adjuster are respectively directly fixed to the side wall plate and the back wall plate, such that an angle between the seat base and the seat back is adjusted by regulating an angle between the side wall plate and the back wall plate via the angle adjuster, wherein the rotation center of the seat back is located at a lower end of the back wall plate, on one side of the seat, the side wall plate, the back wall plate, and the rear support frame are arranged sequentially from an outside to an inside in a width direction of the seat, along the width direction of the seat, each angle adjuster is located between the side wall plate and the back wall plate, a first connecting rod is provided between the two oppositely arranged side wall plates, and two ends of the first connecting rod are respectively fixedly connected with the rotating parts of each angle adjuster, and a second connecting rod is provided between the two side wall plates, and two ends of the second connecting rod are respectively fixedly connected with the front ends of the two sides wall plates.

2. The zero-gravity seat according to claim 1, wherein a hinge-connecting center of the lower end of the rear support frame is located on the front side of the rotation center, a hinge-connecting center of the lower end of the front support frame is located at the rear side of the hinge-connecting center of the upper end of the front support frame.

3. The zero-gravity seat according to claim 1, wherein two front support frames and two rear support frames are provided, the two front support frames are respectively arranged on the front ends of two said side wall plates, and the two rear support frames are respectively arranged on a rear end of the side wall plate.

4. The zero-gravity seat according to claim 1, wherein a front hinge seat and a rear hinge seat are respectively provided on the seat mounting base, and the front support frame is hinged on the front hinge seat, and the rear support frame is hinged on the rear hinge seat.

5. The zero-gravity seat according to claim 1, wherein the rear support frame and the seat back are integrally formed or assembled together.

6. The zero-gravity seat according to claim 1, wherein a driving mechanism is provided on the angle adjuster, the driving mechanism is controlled by a manual drive or an electric drive, and the driving mechanism drives the rotating part of the angle adjuster to rotate, so as to achieve the rotation of the seat back around the rotation center.

7. A vehicle, wherein the vehicle comprises the zero-gravity seat according to claim 1.

8. The zero-gravity seat according to claim 1, wherein the side connecting surfaces of the fixed part and the rotating part of the angle adjuster are respectively fixed to the side wall plate and the back wall plate by welding.

9. The zero-gravity seat according to claim 1, wherein the rear support frame is fixed to the seat back by being fixedly connected to the back wall plate.

10. The zero-gravity seat according to claim 1, wherein the two ends of the first connecting rod respectively pass through the corresponding rear support frames and are fixedly connected to the corresponding rotating parts.

* * * * *